(12) United States Patent  (10) Patent No.: US 6,581,545 B1
Foster  (45) Date of Patent: Jun. 24, 2003

(54) SOFT-SIDED KENNEL COVER

(75) Inventor: Michael A. Foster, Corinth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 10/162,562

(22) Filed: Jun. 6, 2002

(51) Int. Cl.⁷ ................................................. A01K 1/02
(52) U.S. Cl. .......................... 119/482; 119/470; 150/154
(58) Field of Search ................................. 119/452, 470, 119/482, 496, 497; 150/154, 158, 159, 164, 165; D30/107, 118, 119, 199

(56) References Cited

U.S. PATENT DOCUMENTS

| 998,462 A | 7/1911 | Burch | |
|---|---|---|---|
| 3,547,079 A | 12/1970 | Bassett | |
| 3,814,058 A | * 6/1974 | Thompson | 119/482 |
| 4,811,767 A | * 3/1989 | Kessler | 150/154 |
| 5,072,694 A | 12/1991 | Haynes et al. | |
| 5,078,096 A | 1/1992 | Bishop et al. | |
| 5,170,745 A | 12/1992 | Burdette, Jr. | |
| 5,277,148 A | 1/1994 | Rossignol et al. | |
| 5,359,810 A | * 11/1994 | Aul | 47/84 |
| 5,671,698 A | 9/1997 | Farrugia | |
| 5,881,678 A | 3/1999 | Morley | |
| 6,039,393 A | * 3/2000 | Roh | 297/184.13 |
| 6,055,937 A | * 5/2000 | Korpi | 119/452 |
| 6,062,169 A | * 5/2000 | Wade et al. | 119/165 |
| 6,155,206 A | * 12/2000 | Godshaw | 119/453 |
| 6,446,577 B1 | * 9/2002 | Salahor | 119/497 |

OTHER PUBLICATIONS

Dunns catalog, Spring, 1995, p. 82.
"Lazy Pet" catalog page with product codes, crate models UPC Codes.
"Show Insert #U95–0035" advertising page showing crate cover with Nos. and costs.

* cited by examiner

Primary Examiner—Charles T. Jordan
Assistant Examiner—Kimberly S. Smith
(74) Attorney, Agent, or Firm—Locke Liddell & Sapp LLP

(57) ABSTRACT

A soft sided cover for a kennel having a top wall, a bottom wall, a front wall, a rear wall and a pair of side walls forming an enclosure for covering a kennel. The bottom contains an aperture so that the cover can be placed over the kennel to protect the kennel interior from the outside environment. To assist in installing the cover, a detachment mechanism is provided in order to detach a sidewall and the rear wall. This expands the bottom wall aperture. A channel, disposed around the bottom wall aperture, contains a drawstring operable to control the size of said adjustable aperture. Once the cover is installed, the detachment mechanism is used to re-attach the separated walls.

15 Claims, 2 Drawing Sheets

SOFT-SIDED KENNEL COVER

TECHNICAL FIELD OF THE INVENTION

The present invention relates to a cover for a kennel, and more particularly to a soft-sided adjustable cover for easy installation over a pet kennel.

BACKGROUND OF THE INVENTION

A typical pet kennel can be made of wire or molded plastic and can vary in size and shape. These pet kennels are generally exposed to outside conditions with little or no insulation; thus, in certain situations it is desirable to cover the kennel for protection from the outdoor environment. In response, soft-sided kennel covers have been devised to better protect a pet and to provide insulation from the outside environment. However, many of these devices are difficult to install and can only be used with kennels of certain sizes. Oftentimes kennel covers are too small making it difficult to cover the kennel. In some instances the owner will tear the cover when installing it over the kennel, as the fabric sometimes must be stretched to completely cover the kennel. Additionally, kennels can be bent or broken while trying to force the cover to fit over the kennel.

It is therefore desirable to use a soft-sided kennel cover that is adjustable to permit adaptation to various sized kennels in a simple manner with minimal force.

SUMMARY OF THE INVENTION

In accordance with the present invention, a soft-sided kennel cover is provided that can be installed over a kennel in a simple manner. The cover contains a top, a bottom, a front and rear wall and sidewalls forming a flexible cover for placement over a kennel. The bottom contains an aperture to allow the cover to fit over the kennel. A detachment mechanism, disposed between a pair of adjacent walls, is used to separate the walls to expand the bottom aperture to more easily install the cover over the kennel. Once the cover is placed over the kennel and properly aligned, the detachment mechanism is used to re-attach the walls. An adjustment mechanism, most preferably a draw string, can be used to adjust the size of the bottom aperture to fit the cover snug over the kennel and to prevent the cover from loosening and/or detaching while in use.

BRIEF DESCRIPTION OF THE DRAWINGS

For a more complete understanding of the present invention and for further advantages thereof, reference is now made to the following description of the preferred embodiments taken in conjunction with accompanying drawings in which.

DESCRIPTION OF THE PREFERRED EMBODIMENTS

Figure 1:
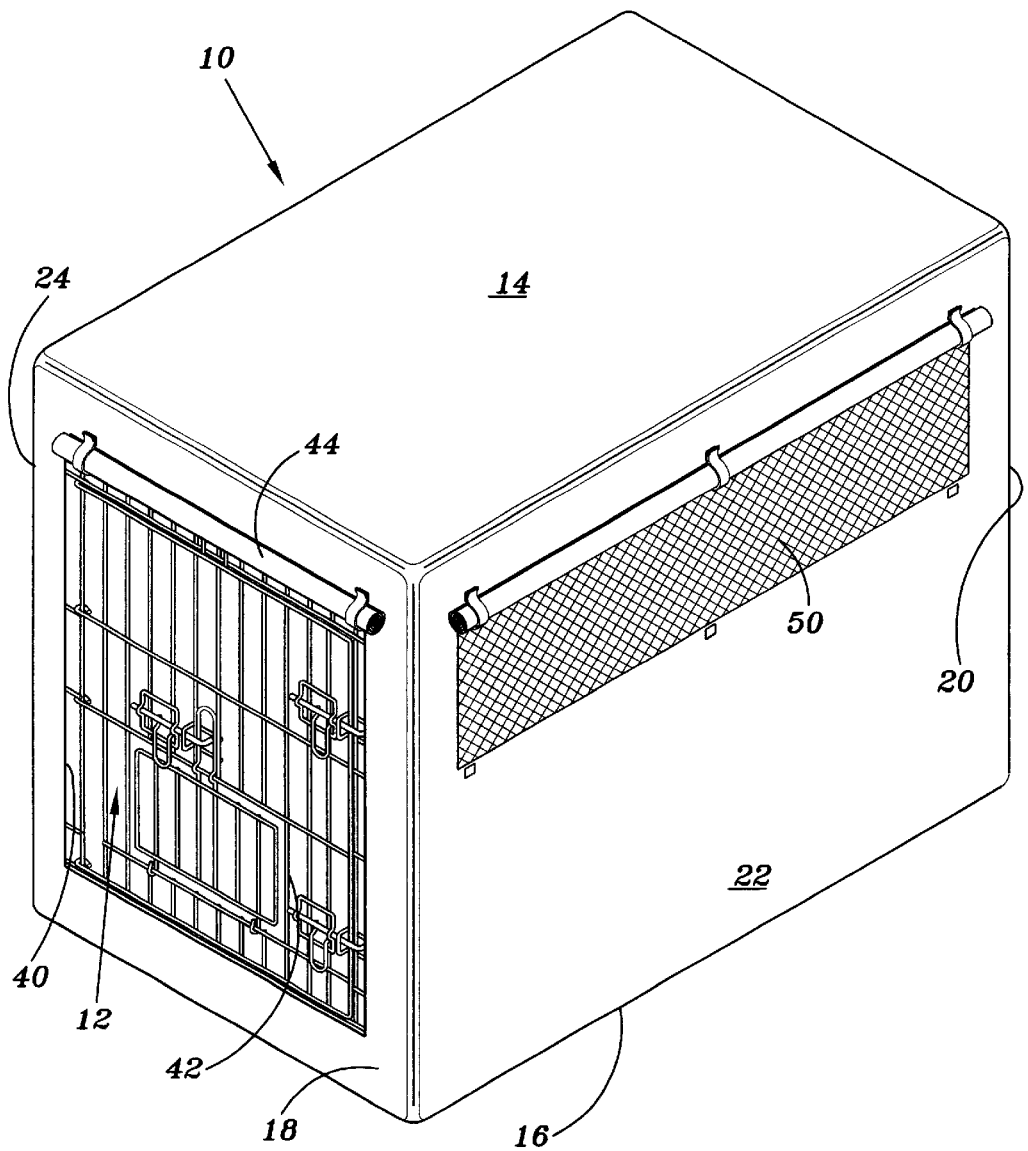
FIG. 1 is a perspective view showing the kennel cover installed over the kennel.

As seen in FIG. 1, a kennel cover 10 is provided to cover and insulate a pet kennel 12 from the outside environment. Cover 10 contains a top wall 14, a bottom wall 16, a front wall 18, a rear wall 20, a first sidewall 22 and a second sidewall 24 to form an enclosure to fit over kennel 12.

Bottom wall 16 contains an aperture 26 (FIG. 3) to permit easy installation over kennel 12 when it is desired to cover the kennel. During installation, the user aligns aperture 26 with the top wall of the kennel to slide cover 10 to cover the kennel. A detachment mechanism 28, such as, for example, a zipper is preferably located between sidewall 22 and rear wall 20 such that during installation sidewall 22 and rear wall 20 can be separated to enlarge aperture 26 to fit over and around kennel 12. Detachment mechanism 28 can also be constructed to allow attachment and separation of walls 20 and 28 by using hook and loop material, buttons, snaps or the like.

Figure 2:
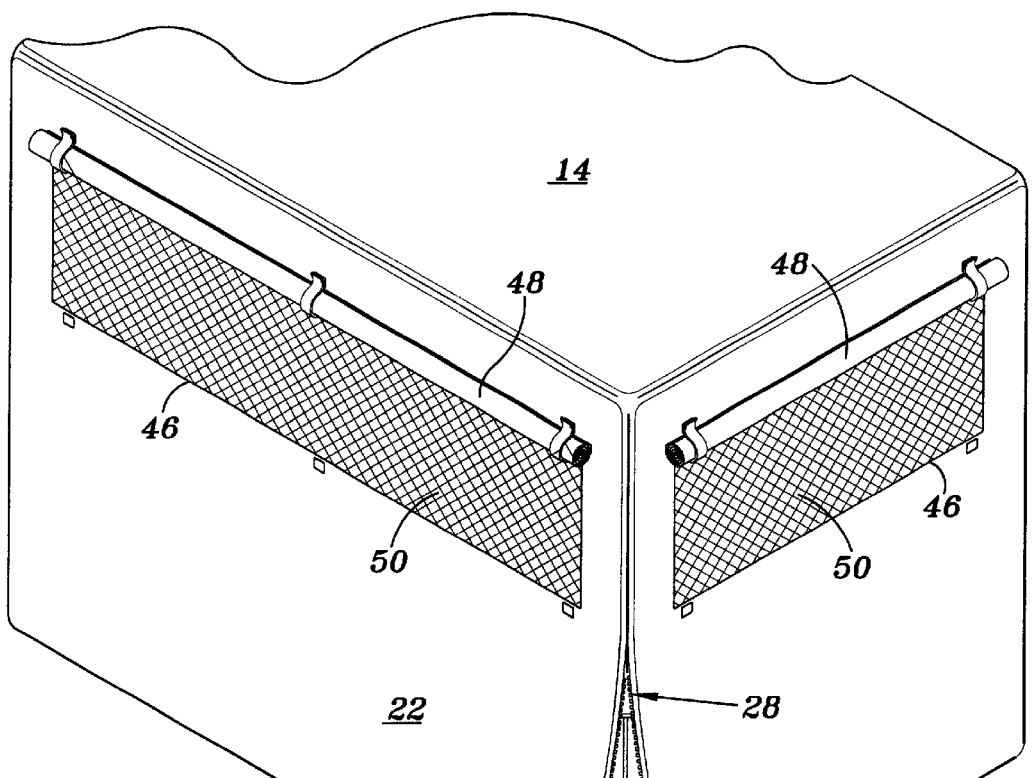
FIG. 2 is a perspective view illustrating the detachment mechanism and the adjustment mechanism.
Figure 3:
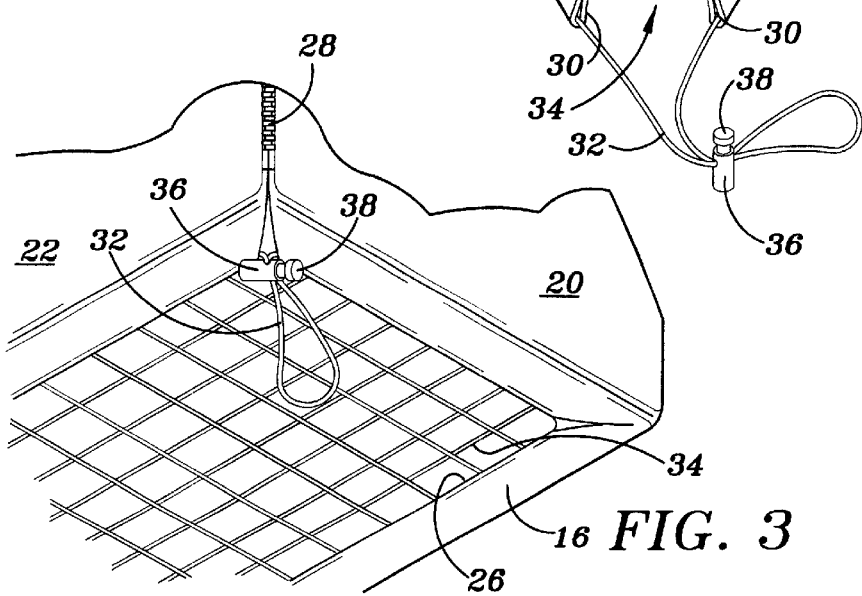
FIG. 3 is a perspective view of the bottom aperture, the detachment and adjustment mechanisms.

As seen in FIGS. 2 and 3, a channel 30 is formed around the perimeter of aperture 26 to house a drawstring 32. Drawstring 32 is a continuous thread configured to extend the entire length of channel 30 while also having an excess portion located outside the channel. The excess portion is used as a grip which when pulled reduces the size of aperture 26 so as to conform bottom wall 16 to kennel bottom wall 34. In order to tighten bottom wall 16 around kennel bottom wall 34, the user removes the excess slack that remains in channel 30 by pulling drawstring 32. A cord lock 36 is disposed on the excess portion of drawstring 32. Once the excess slack is removed from channel 30, cord lock 36 is placed adjacent channel 30 to prevent drawstring 32 from loosening while cover 10 is disposed over kennel 12. Cord lock 36 frictionally engages drawstring 32 so as to prevent cord lock 36 from sliding thereon. In order to release cord lock 36 to permit movement on drawstring 32, the user presses button 38. This releases the frictional engagement and allows cord lock 36 to move along drawstring 32.

Cover 10 contains an opening 40 to provide access to entrance door 42. Opening 40 can be closed with a door flap 44. As seen in FIG. 1, door flap 44 can be rolled up and stored along the upper edges of opening 40 by using hook and loop material, buttons, snaps or the like. Opening 40 is configured and sized such that the uses of kennel doors, which are hinged to the kennel, are still operable.

Sidewalls 22 and 24 and rear wall 20 can each contain a ventilation opening 46 to allow air flow through and inside cover 10. Openings 46 are closed with a flap 48, which can be positioned between an open position (FIGS. 1 and 2), and a closed position, where the openings are covered so as to prevent circulation. Ventilation openings 46 can optionally contain a wire mesh screen 50, as seen in FIGS. 1 and 2, to prevent small insects from entering through the opening.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

I claim:

1. A soft sided kennel cover for covering a kennel, the kennel cover comprising:

a top wall;

first and second spaced apart sidewalls:

a front wall and a rear wall;

a bottom wall attached to said front wall, said rear wall, and said first and second sidewalls for fastening the kennel cover to the kennel, said bottom wall spaced apart from said top wall and extending generally parallel to said top wall, said bottom wall including a bottom wall aperture having a size for receiving the kennel; and one of said sidewalls being selectively attachable to said rear wall such that during assembly of the kennel cover to the kennel, said one of said sidewalls and said rear wall are detached to thereby expand said bottom wall aperture, and after assembly, said one of said sidewalls and said rear walls are attached.

2. The kennel cover of claim 1 wherein said bottom wall aperture is adjustable to vary said size; said bottom wall includes a channel disposed around said bottom wall aperture; a draw string disposed within said channel and operable to vary said size of said bottom wall aperture.

3. The kennel cover of claim 1 and further including a zipper for selectively attaching said one of said sidewalls to said rear wall.

4. The kennel cover of claim 1 and further including a plurality of buttons for selectively attaching said one of said sidewalls to said rear wall.

5. The kennel cover of claim 1 and further including a hook and loop material for selectively attaching said one of said sidewalls to said rear wall.

6. The kennel cover of claim 1 wherein one of said walls include a ventilation opening.

7. The kennel cover of claim 6 wherein said ventilation opening contains a flap movable between an open position, to allow air to flow through the opening, and a closed position, to cover said ventilation opening to prevent air from flowing through the opening.

8. A soft sided kennel cover for covering a kennel, the kennel cover comprising:

a top wall;

first and second spaced apart sidewalls:

a front wall and a rear wall;

a bottom wall attached to said front wall, said rear wall, and said first and second sidewalls for fastening the kennel cover to the kennel, said bottom wall spaced apart from said top wall and extending generally parallel to said top wall, said bottom wall including an aperture having a size for receiving the kennel;

one of said sidewalls being selectively attachable to said rear wall along an edge;

a detachment mechanism disposed on said edge wherein said detachment mechanism is operable between a detached position and an attached position;

wherein when said detachment mechanism is in said detached position, said sidewalls and said rear wall are separated to thereby expand said bottom aperture; and wherein when said detachment mechanism is in said attached position, said sidewall and rear wall are attached together.

9. The kennel cover of claim 8 wherein said first and second sidewalls each contain a first end and a second end, said front wall is disposed perpendicular to said first ends of said sidewalls, and said rear wall is disposed perpendicular to said second ends of said sidewalls forming a plurality of corners, wherein said edge is aligned with one of said plurality of corners.

10. The kennel cover of claim 8 wherein said bottom wall aperture is adjustable to vary said size; said bottom wall includes a channel disposed around said bottom wall aperture; a draw string disposed within said channel and operable to vary said size of said bottom wall aperture.

11. The kennel cover of claim 8 wherein said detachment mechanism is a zipper.

12. The kennel cover of claim 8 wherein said detachment mechanism is a plurality of buttons.

13. The kennel cover of claim 8 wherein said detachment mechanism is a hook and loop fastener material.

14. The kennel cover of claim 8 wherein one of said walls include a ventilation opening.

15. The kennel cover of claim 14 wherein said ventilation opening contains a cover movable between an open position, to allow air to flow through the opening, and a closed position, to cover said ventilation opening to prevent air from flowing through the opening.

* * * * *